D. L. QUINN.
FEED TROUGH FOR POULTRY CRATES.
APPLICATION FILED OCT. 14, 1916.
1,253,723. Patented Jan. 15, 1918.
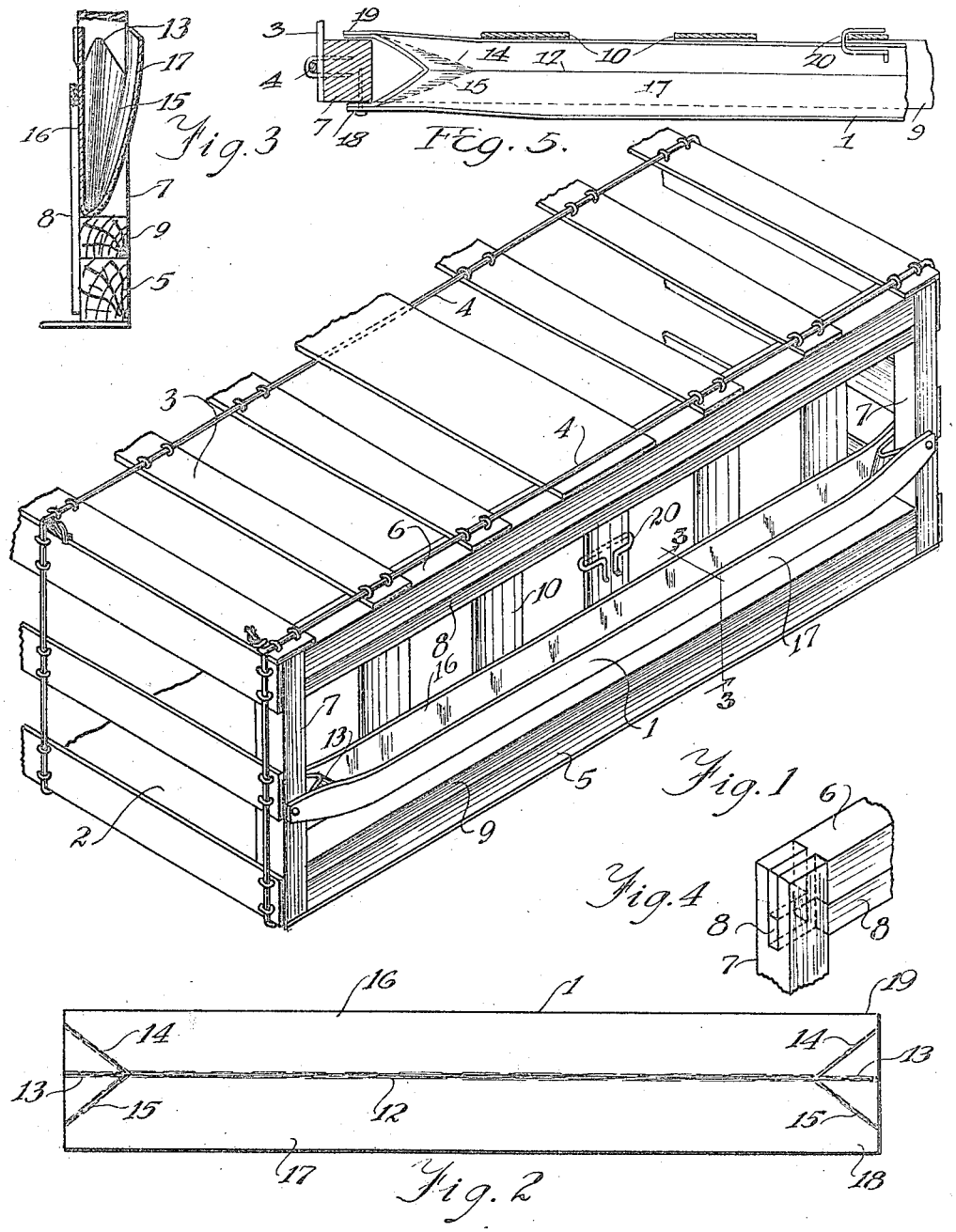

UNITED STATES PATENT OFFICE.

DON L. QUINN, OF OAK PARK, ILLINOIS, ASSIGNOR TO CHICAGO MILL AND LUMBER COMPANY, A CORPORATION OF ILLINOIS.

FEED-TROUGH FOR POULTRY-CRATES.

1,253,723.  Specification of Letters Patent.  Patented Jan. 15, 1918.

Application filed October 14, 1916. Serial No. 125,579.

*To all whom it may concern:*

Be it known that I, DON L. QUINN, a citizen of the United States of America, and a resident of Oak Park, county of Cook, and State of Illinois, have invented certain new and useful Improvements in Feed-Troughs for Poultry-Crates, of which the following is a specification.

The main objects of the invention are to provide an improved form of feed trough which may be formed of water proofed fiber board paper, or other inexpensive sheet material, and particularly suitable for attachment to shipping crates for poultry.

A specific embodiment of this invention is illustrated in the accompanying drawings, in which:

Figure 1 is a perspective view of a poultry crate provided with the improved trough.

Fig. 2 is a detail showing the form of and method of scoring the blank from which the trough is formed.

Fig. 3 is a sectional detail taken on the line 3—3 of Fig. 1.

Fig. 4 is a fragmentary detail showing the mortised joint of the end frames.

Fig. 5 is a fragmentary plan of the feed trough with the adjacent parts of the crate shown in section.

In the poultry trade at the present time there are in use large quantities of poultry crates or coops designed with a view to making them so inexpensive that they can be profitably used for one-way shipments and then destroyed. Usually such crates are not provided with feed and water receptacles because of the additional expense involved, and the stock shipped in them is either not fed or watered at all, or the feed is merely thrown into the crate. The herein described invention is particularly applicable to shipping crates of this kind because it has the important qualities of being extremely inexpensive to manufacture, easy to apply to the crate, readily foldable against the crate when not in use, amply durable for the purpose of one-way shipment, both sanitary and efficient as a food container, and at the same time capable of being shipped or stored in quantity in a minimum of space.

A typical form of wire bound veneer one-way shipping crate is shown in the drawings with the improved feed trough applied thereto.

In the form shown the crate comprises a mat consisting of a bottom or floor 2 and a series of parallel slats 3, all made of thin veneer boards of equal length and bound together at their ends and middle portions by means of wires 4, which are secured by staples to the individual boards or slats. The bottom is reinforced by end frame bars 5, those of the slats 3 which form the top are also attached at their ends to end frame bars 6 by the same staples which connect them to the end wires 4, and those of the slats 3 which are to form the sides of the assembled crate are similarly connected to end frame bars 7. The end panels are formed separate from said mat, and comprise top and bottom frame bars 8 and 9 spaced apart and connected together by upright veneer slats 10. The frame bars 5, 6, 8, and 9 are provided with tenons on their ends which engage mortises in the ends of the upright end bars 7. These mortises and tenons are illustrated in the fragmentary detail Fig. 4.

When the crate is assembled the end frame is placed with the slats 10 toward the inside, thus providing a convenient place for the feed trough 1, as will appear from Fig. 1. In the form shown the feed trough 1 comprises a rectangular blank of suitable sheet material, such as water proofed fiber board, which is provided with a longitudinal score 12 branching at each end into three scores 13, 14, and 15, the scores 14 and 15 being on the same side of the sheet as the score 12, and the score 13 being on the opposite side but in line with the score 12. The trough is formed by bending the sheet along the score 12 and pressing the triangular end portions between the scores 14 and 15 inward, as will appear from Fig. 1, thus forming a water-tight trough with closed bifurcated ends. The length of the trough is such that when the trough is seated in place on the end bar 9, as shown in Fig. 1, its bifurcated ends may be caused to straddle the upright end frame bars 7 of the crate, the inner corner portions or ears 19 being inserted behind the end bars 7, and the outer end portions or ears 18 may then be nailed or otherwise fastened to the upright 7 to prevent displacement of the trough. By having the diagonal scores 14 and 15 meet the ends of the trough blank inward of the sides thereof, it will be necessary to drive the nails or tacks through only a single thickness of material. The side 16 of the trough lies against the slats 10 of the crate while the side 17 naturally bows outward. It is therefore desirable to have the fold 12 located nearer the side 16 so that the bowed edge of the wall 17 will stand at a sufficient height to hold the desired amount of water.

Means, such as a wire clip 20 slidably mounted on one of the slats 10, may be provided for holding the trough in a folded position close against the slats 10 when it is not in use.

When the trough is to be applied to the crate, it is first folded along the score lines, which are comparatively limber, and is then secured in place by inserting the ears 19 behind the uprights 7, whereby the rear wall 16 of the trough is held substantially rigid by virtue of the slats 10 on one side and the member 7 on the opposite side. The ears 18 are then fastened to the uprights 7 by any convenient means, as for instance nails or screws.

For separate return shipment, the feed troughs may be removed from the crates by withdrawing the nails or other fastenings from the ears 18, thus releasing the trough, whereupon it may be straightened out flat by virtue of the limber fold lines. When a quantity of the troughs have been collected, they may be bundled together flat and returned to the poultry shipper for further use.

Although but one specific embodiment of this invention is herein shown and described, it will be understood that the specific form of trough shown is capable of considerable modification through the alteration or omission of details, without departing from the spirit of this invention, and that the invention is not limited to use with the specific form of crate shown.

I claim:

1. A poultry crate with a feed trough attached thereto, said trough comprising a strip of sheet material bent lengthwise upon itself into the form of a trough with its ends bent inwardly, and means movably mounted on the crate adapted to retain one wall of said trough against the other.

2. A poultry crate having a rectangular end frame provided with slats attached to the inner side of said frame, and a feed trough in the plane of said frame and attached thereto, said trough comprising a strip of sheet material bent into the form of a trough with the central portion of its ends bent inwardly and upwardly to close the ends of the trough and form projecting ears thereon, one of said ears at each end of the trough being secured to the end members of the said frame.

3. A poultry crate having a rectangular end frame provided with slats attached to the inner side of said frame, and a feed trough in the plane of said frame and resting on the bottom member of said frame, said trough comprising a strip of sheet material bent into the form of a trough with the central portion of its ends bent inwardly and upwardly to close the ends of the trough and form projecting ears thereon, one of said ears at each end of the trough being secured to the end members of the said frame.

4. A poultry crate, comprising a wall including a rectangular frame and a plurality of inwardly disposed slats attached to the upper and lower frame members, in combination with a feed trough in the form of a strip of sheet material having its ends folded upward medially for closing the ends of the trough and providing front and rear ears thereon, said trough being mounted interiorly of said frame and against said slats with two of its ears behind the end frame members respectively and with the other two ears secured to the front sides of said members respectively.

5. A poultry feed trough, comprising a suitably folded rectangular strip of sheet material of the nature of fiber-board, said strip having a lengthwise score and branch scores near the ends of the strip radiating from said lengthwise score toward the corners of the strip by virtue of which said strip has limber fold lines, whereby without breaking it may be bent along said lines into the form of a trough with closed ends and with a pair of longitudinal arms spaced apart at each end.

6. A feed trough for poultry, comprising a strip of fiber-board having at each end three scores radiating from a point near the end toward the adjacent corners and a medial point on the end respectively, the medial score being on one side of said strip and the other two being on the opposite side whereby said strip is rendered limber along the score lines, and may be bent correspondingly along said lines into the form of a trough with closed ends.

Signed at Chicago this 12th day of October, 1916.

DON L. QUINN.